United States Patent
McCoy

(10) Patent No.: US 10,912,396 B2
(45) Date of Patent: Feb. 9, 2021

(54) UNIVERSAL SMART CHILD PAD

(71) Applicant: Tiffany Louise McCoy, Chicago, IL (US)

(72) Inventor: Tiffany Louise McCoy, Chicago, IL (US)

( * ) Notice: Subject to any disclaimer, the term of this patent is extended or adjusted under 35 U.S.C. 154(b) by 229 days.

(21) Appl. No.: 16/245,948

(22) Filed: Jan. 11, 2019

(65) Prior Publication Data
US 2020/0113351 A1    Apr. 16, 2020

Related U.S. Application Data

(60) Provisional application No. 62/744,195, filed on Oct. 11, 2018.

(51) Int. Cl.
| | |
|---|---|
| *A47D 15/00* | (2006.01) |
| *B60N 2/28* | (2006.01) |
| *A47D 13/08* | (2006.01) |
| *A47D 7/00* | (2006.01) |
| *A47D 9/00* | (2006.01) |
| *A47D 13/00* | (2006.01) |
| *B60N 2/90* | (2018.01) |
| *B60N 2/56* | (2006.01) |

(52) U.S. Cl.
CPC ......... *A47D 15/003* (2013.01); *A47D 15/006* (2013.01); *A47D 15/008* (2013.01); *B60N 2/2881* (2013.01); *A47D 7/00* (2013.01); *A47D 7/007* (2013.01); *A47D 9/00* (2013.01); *A47D 13/00* (2013.01); *A47D 13/08* (2013.01); *B60N 2/5678* (2013.01); *B60N 2/976* (2018.02)

(58) Field of Classification Search
CPC . A47D 7/00; A47D 7/007; A47D 9/00; A47D 13/00; A47D 13/02; A47D 13/06; A47D 13/08; A47D 15/00; A47D 15/001; A47D 15/003; A47D 15/005; A47D 15/006; A47D 15/008; B60N 2/2881; B60N 2/976; B60N 2/5678
See application file for complete search history.

(56) References Cited

U.S. PATENT DOCUMENTS

| | | | |
|---|---|---|---|
| 6,175,981 B1 * | 1/2001 | Lizama | A47D 9/02 5/655 |
| 8,397,518 B1 * | 3/2013 | Vistakula | A61F 7/007 62/3.5 |
| 8,769,737 B1 * | 7/2014 | Duggins | A47D 7/00 5/93.1 |
| 9,272,647 B2 * | 3/2016 | Gawade | B60N 2/5678 |
| 10,806,274 B2 * | 10/2020 | Gersin | A61H 23/0263 |

(Continued)

*Primary Examiner* — Robert G Santos
*Assistant Examiner* — Rahib T Zaman
(74) *Attorney, Agent, or Firm* — Olson & Cepuritis, Ltd.

(57) ABSTRACT

A smart child pad is provided that may be universally used in infant, toddler and child carrying devices, such as car seats, high chairs, strollers or cribs in which the child pad contains components for heating, vibrating and massaging the occupant of the child carrying device with those components being controlled and monitored remotely by mobile applications, blue tooth or Wi-Fi capabilities so that the individual environment of each child carrying device to maintain comfortable and acceptable environments while so that infants, toddlers and children are lying or sitting in or being transported in such child carrying devices.

11 Claims, 5 Drawing Sheets

(56) References Cited

U.S. PATENT DOCUMENTS

| | | | |
|---|---|---|---|
| 2005/0278854 A1* | 12/2005 | Taricani, Jr. | A47D 13/08 5/655 |
| 2006/0010605 A1* | 1/2006 | Kamrin-Balfour | A47C 7/72 5/655 |
| 2013/0109931 A1* | 5/2013 | Ng | A47D 15/003 600/301 |
| 2015/0250329 A1* | 9/2015 | Murray | A47G 9/0215 5/101 |
| 2018/0055246 A1* | 3/2018 | Paperno | A41B 13/06 |

* cited by examiner

UNIVERSAL SMART CHILD PAD

CROSS-REFERENCE TO RELATED APPLICATION

This application claims the benefit of U.S. Provisional Application No. 62/744,195 filed Oct. 11, 2018 and hereby incorporates the entire disclosure of that application by reference.

FEDERALLY SPONSORED RESEARCH OR DEVELOPMENT

Not Applicable.

BACKGROUND THE INVENTION

A universal smart child pad is provided to be used for children of various ages in association with car seats, high chairs, strollers or cribs or any type of child carrying device. At present, such devices are provided with certain features directed to insuring that the positioning of infants, toddlers and older children is such that lying or and sitting postures are maintained or improved. However, what is lacking from current child carrying devices is the ability to improve the individual environment for the occupants and to provide certain creature comforts that adults take for granted.

The present invention fills that void by providing a smart child pad that may be universally used in infant, toddler and child car seats, high chairs, strollers or cribs or other child carrying device to monitor and control the individual environment of each child carrying device while infants, toddlers and children are lying or sitting in the child carrying device or being transported in the child carrying device. The individual environment may be controlled manually or by use remote control devices or mobile applications, blue tooth or As an alternative to a universal smart child pad, the elements or features for controlling the individual environment may be directly incorporated into the infant, toddler and child carrying devices.

SUMMARY OF THE INVENTION

The present invention relates generally to a smart child pad that may be used in conjunction with child carrying devices, such as car seats, high chairs, strollers or cribs, that provides warming, cooling and vibrating features for each individual child carrying device with such features being capable of being monitored or controlled by others when such child carrying devices are in use or will be used by infants, toddlers or children. The smart child pad may also include audio capabilities for sounds and music. Controls for such features may be manual or remotely controlled by mobile applications, blue tooth or Wi-Fi capabilities and which may be battery operated or USB ready to be connected to external power sources.

The present invention provides a smart child pad that may be universally used in child carrying devices so that the individual environment of each device may be monitored and controlled to provide infants, toddlers and children with comfortable and acceptable environments while sitting or lying in such devices or being transported in those devices. Alternatively, such environmental features and controls could be incorporated directly into car seats for infants, toddlers or children.

BRIEF DESCRIPTION OF THE DRAWINGS

FIG. 1a is an enlarged view of the control panel for heating, vibrating and speaker elements of the universal smart child pad of the present invention.

FIG. 3a is an enlarged view of the control panel for heating, vibrating and speaker elements of the universal smart child pad of the present invention.

FIG. 3b is an enlarged view of the memory card opening in the battery pack of the universal smart child pad of the present invention.

DETAILED DESCRIPTION OF THE PREFERRED EMBODIMENT

Figure 1:
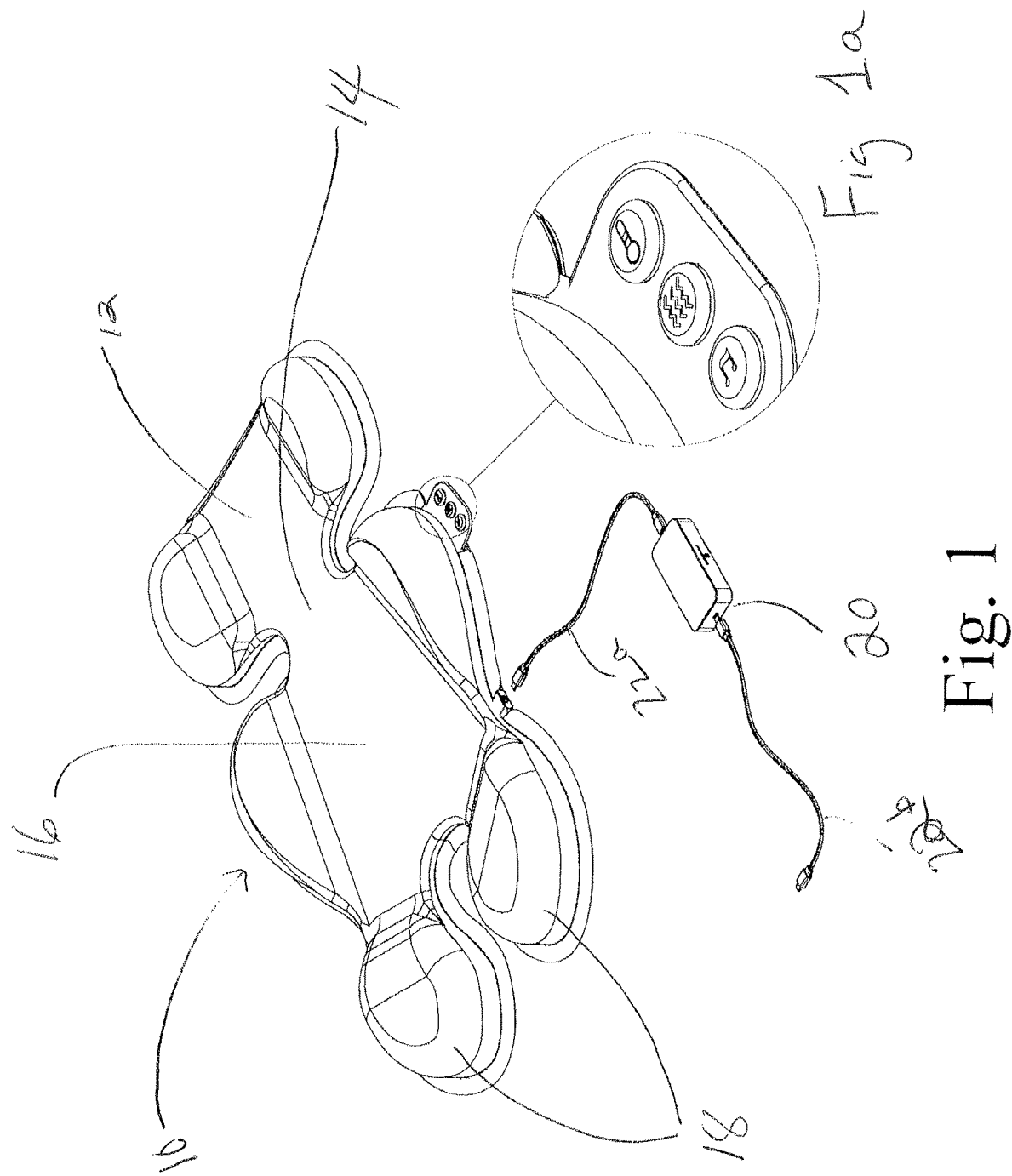
FIG. 1 is a top perspective view of the universal smart child pad of the present invention.

One embodiment of the universal smart child pad of the present invention is shown generally FIGS. 1 and 1a. The typical smart child pad 10 is generally contoured to mimic the torso of an infant or child, having a head area 12, neck area 14, back area 16 and leg areas 18. The suggested material of choice for child pad 10 is polyurethane foam which will provide a degree of flexibility for the pad 10 to be used in different child carrying devices, such as car seats, high chairs or strollers or to lie flat in a crib. Other materials which provide flexibility and support may also be used. As shown in FIG. 1, portions of head area 12 on either side of the head area are preferably thicker than the head area and provide support and potentially a barrier to excessive lateral movement of an infant or child's head. Likewise, the side portions of the pad at the back area 16 are thicker than the back area to provide support and potentially a barrier to excessive lateral movement of an infant or child. Leg areas 18 are thicker than the head and back areas barrier to provide support for an infant or child's legs.

A case 20, for containing batteries which may be rechargeable, is also provided with USB cable 22a for connecting to the smart child pad 10 to supply the necessary power for heating, vibrating and speaker elements of the child pad which will be explained in more detail later. Case 20 may also contain a memory card reader for reading a memory card containing music or sound to be transmitted through the speaker elements. Optionally, USB cable 22b is provided to connect case 20 and child pad to an external power source such the USB ports found in an automobile. FIG. 1a shows an enlarged view of the manual control panel for the heating, vibrating and speaker elements of smart child pad 10. The control panel is preferably a printed control board (PCB) which is enclosed in silicon with heating, vibrating and music symbols printed over the corresponding respective controls.

Figure 2:
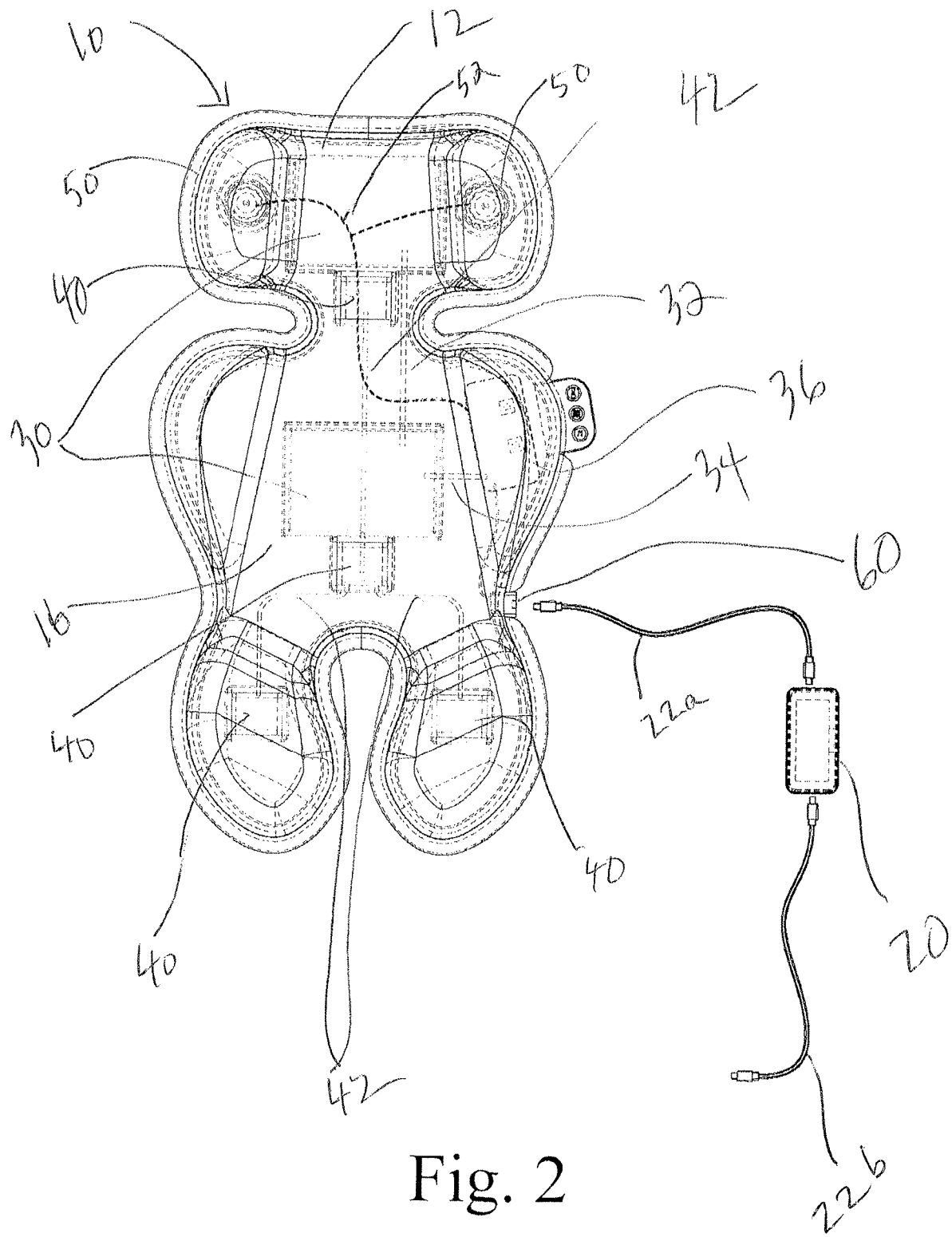
FIG. 2 is a top view of a schematic of the universal smart child pad of the present invention which illustrates the location of the heating, vibrating and speaker elements and the connections between those elements to the control panel.

FIG. 2 is a top view of a schematic of the smart child pad 10 of the present invention which illustrates the location of the heating, vibrating and speaker elements and the connections between those elements to the control panel. Heating pad elements 30 are preferably located in the head area 12 and the back area 16. Electrical wiring 32 is provided to connect the heating pad elements 30 to each other and the same type of wiring 34 is provided to connect them to printed circuit board (PCB) control panel 36. Vibrating elements 40 are also connected by way of electrical wiring 42 with the same type of wiring being used connect them to control panel 36. Sound or music speakers 50 are located in the side portions of head area 12 and are attached to control panel 36 by means of electrical wiring 52. Control panel 36 is electrically connected to USB port 60 which in turn is connected to case 20 by way of USB cable 22a.

Figure 3:
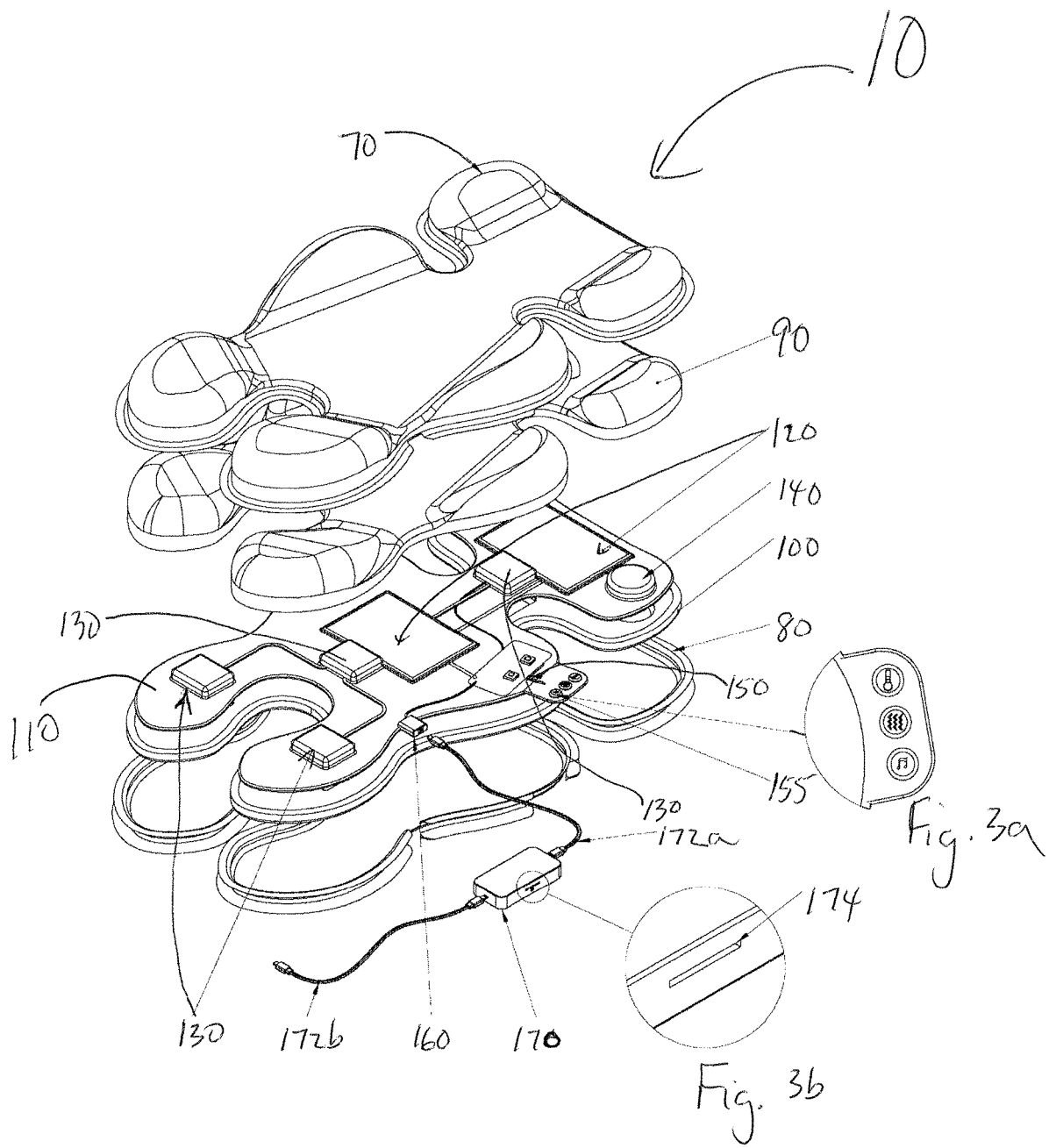
FIG. 3 is an exploded view of the of the universal smart child pad of the present invention.

FIG. 3 shows an exploded view of the smart child pad 10 of the present invention. In one embodiment, the smart child pad 10 has breathable fabric, such as a soft plush durable lightweight polyester material, which covers the pad, having a top layer 70 and a bottom layer 80. Between those layers are polyurethane foam layers 90 and 100 between which silicon layer 110, containing the electrical elements for the heating, vibrating and speaker elements of the present invention, is located. Silicon layer 110 preferably has pockets into which heating elements 120, vibrating elements 130 and speaker elements 140 (one of which is not visible) may be inserted. Silicon layer 110 also contains, preferably embedded therein, the necessary electrical wiring to connect those elements to each other and to the PCB control panel 150 and the wiring to connect that panel to USB port 160. Control symbols for heating, vibrating and music are printed over silicon enclosure 155 for manual control of those features. Silicon layer 110 also preferably contains pockets for PCB control panel 150 and USB port 160. As noted previously, USB port 160 can be connected to case 170 (containing batteries and possibly a memory card) by way of cable 172a. The case 170 can also be connected to an external power source by cable 172b.

FIG. 3a, like FIG. 1a, shows an enlarged view of the covered manual control panel for the heating, vibrating and speaker elements of smart child pad 10. The control panel 160 is preferably a printed control board (PCB) which is enclosed in silicon with heating, vibrating and music symbols 155 printed over the corresponding respective controls. FIG. 3b is an enlarged view of case 170 which contains batteries and possibly a memory card reader (not shown). Case 170 has a slit 174 for insertion of a memory card containing music or sound to be transmitted through speaker elements 140.

Figure 4:
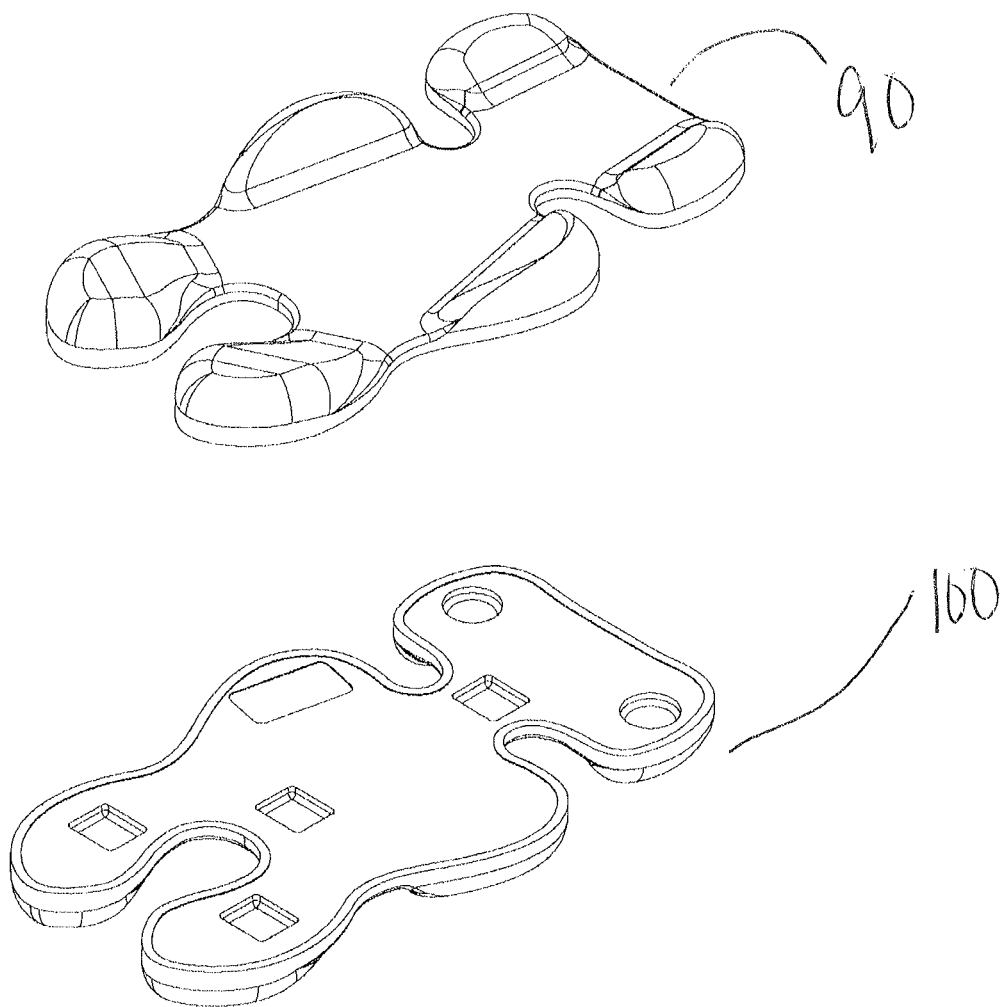
FIG. 4 is an exploded view of the top and bottom sections of the universal smart child pad of the present invention.
Figure 5:
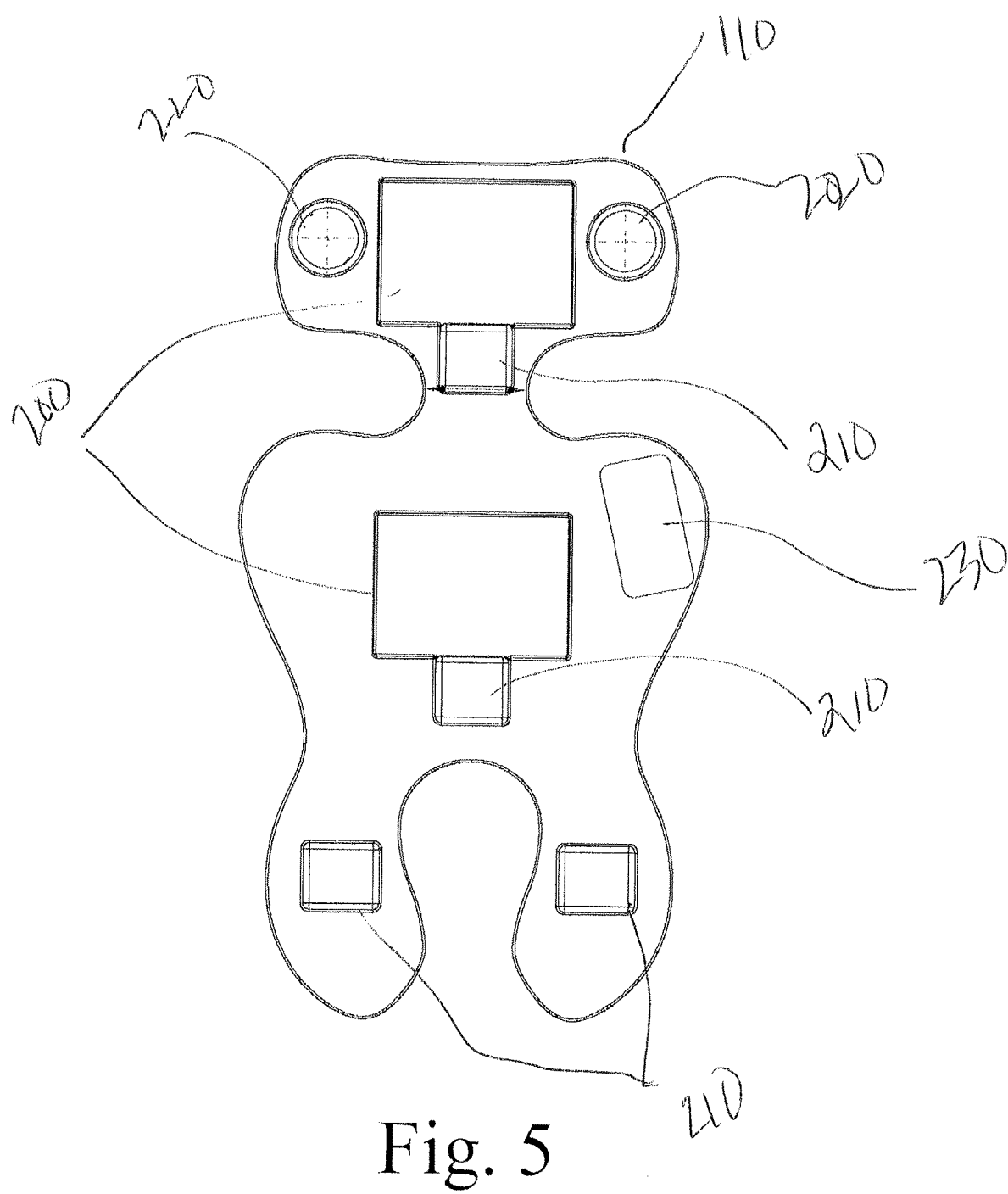
FIG. 5 is a top view of the layer containing the heating, vibrating and speaker elements of the universal smart child pad of the present invention.

FIG. 4 shows a side view of the polyurethane foam layers 90 and 100 of the smart child pad 10 shown in exploded view in FIG. 3. FIG. 5 is a top view of the silicon layer 110 of the smart child pad 10 shown in exploded view in FIG. 3, showing pockets 200 for the heating elements, pockets 210 for the vibrating elements, pockets 220 for the speaker elements and pocket 230 for the control panel. Silicon layer 110, with the heating vibrating, music elements and control panel secured thereto, is designed to fit into the lower polyurethane foam layer 100 of FIG. 4 with the upper foam layer 90 placed over silicon layer 110. Polyurethane foam layers 90 and 100 may then be affixed to each other by sewing the layers together, or by other means such as zippers or hook and loop fasteners, to provide the smart child pad 10 of the present invention.

As noted above, FIG. 2 illustrates schematically the location of the heating elements 30, vibrating elements 40 and speaker elements 50 and the connections between those elements and control panel 36. Heating elements 30 may be miniaturized versions of known heating pads and vibrating elements 40 may be miniaturized versions of vibrating or massaging pads or pillows. Heating elements 30 and vibrating elements 40 are preferably constructed to be placed in pockets in silicon layer 110 (as shown in FIGS. 3 and 5) and with electrical wiring provided to connect heating elements 30 and vibrating elements 40 to USB port 60 (shown in FIG. 2) to provide power to those elements either by battery 20 or other external power sources through USB connection 22b. In the preferred embodiment, heating elements 30 and vibrating elements 40 have a variety of settings with the control panel 36 including an emergency automatic shut off feature for safety purposes. For example, a thermostat may be included to control heating elements 30 and provide protection for overheating and to automatically shut off those elements.

As shown in FIG. 2, control panel 36 provides manual controls for monitoring and controlling heating elements 30 and vibrating elements 40. Monitoring and control of those elements may also be accomplished remotely by way of a separate remote control unit (not shown) or through use of a mobile application on a mobile device or by use of Wi-Fi capabilities.

As also shown in FIG. 2, speaker elements 50 are provided in the head area of universal child pad 10 to provide white sounds or music to soothe an infant or child. Speaker elements 50 are preferably constructed to be placed in pockets in silicon layer 110 (as shown in FIGS. 3 and 5) and with electrical wiring provided to connect speakers 50 to USB port 60 (shown in FIG. 2) to provide power to speaker elements 50 either by battery 20 or other external power sources through USB connection 22b. Speaker elements 50 are preferably provided with the necessary equipment to be Bluetooth or Wi-Fi accessible. Like heating elements 30 and vibrating elements 40, speaker elements 50 may be controlled manually at control panel 36 or by a remote control device (not shown), a mobile application on a mobile device or by use of Wi-Fi capabilities.

The universal child pad 10 of the present invention may also be further customized to adapt to car seats or strollers and may include heating or cooling elements designed to fit into a cup holder on a car seat 10 to provide heating or cooling for bottles or cups that are placed in the cup holders. Like heating element 30, the heating and cooling element may be battery operated or connectable to a USB port and may be controlled manually or remotely by way of a separate remote control unit, through a mobile application on a mobile device or by use of Wi-Fi capabilities. As an additional feature for older children, one or more USB port may be provided in child pad 10 to connect to and power a tablet or portable electronic device. Also, a holding feature could be attached to hold a tablet or portable electronic device.

The child pad 10 of the present invention also preferably includes a fabric covering, shown in FIG. 3 as items 70 and 80 that is fitted to enclose child pad 10. If the covering is removable, it should be made form a material that is machine washable. Alternatively, the fabric covering could be cleaned using a fabric spray cleaner.

An alternative embodiment of the present invention may include elements that provide heating and cooling. A further embodiment may incorporate heating, vibrating and speaker elements contained in the child pad 10 described above directly into a portable or built-in infant, toddler or child car seat. Also, the monitoring or control features of could be part of an automobile remote start device which would remotely start the environmental features of the car seat at the same time as the automobile is remotely started.

The previous descriptions are of the preferred embodiments for implementing the invention and the scope of the invention should not be limited by this description,

What is claimed is:

1. A universal smart child pad for controlling the environment of an occupant comprising:
    an upper layer of flexible and supportive material shaped to conform generally to the body of an infant or child;
    a lower layer of flexible and supportive material that mates with the upper layer;
    a silicon layer located between the upper and lower flexible layers;
    the silicon layer having pockets for containing various electronic components including heating elements, vibrating elements, speaker elements, at least one USB port and at least one control panel;
    the at least one control panel being operatively connected to the heating, vibrating and speaker elements and the at least one USB port;
    said upper layer, silicon layer and lower layer being affixed to each other to form a universal child pad;
    an external power source being provided that is connected to the USB port of the silicon layer so that when the control panel is activated, the heating, vibrating and speaker elements are activated to control the environment of the universal child pad.

2. The universal child pad of claim 1 wherein the upper layer is configured to have areas corresponding to the head area, neck area, torso area and leg area of the occupant, those areas being of sufficient thickness to provide support for the occupant when the child pad is used.

3. The universal child pad of claim 2 wherein the head area and torso area have side portions which are thicker than the general head and torso areas and extend above the head and torso areas to provide additional support and a barrier to excessive lateral movement of the occupant.

4. The universal child pad of claim 3 wherein the leg area is thicker than the central portions of the head area and torso area to provide additional support to the occupants legs.

5. The universal child pad of claim 1 wherein the external power source is an external case containing a battery power source having at least two USB ports and cables associated therewith.

6. The universal child pad of claim 5 wherein the external case is connected to the USB port of the universal child pad through one USB cable.

7. The universal control pad of claim 6 wherein the external case contains a memory card reader for reading a memory card containing music or sound for the speaker elements.

8. The universal child pad of claim 6 wherein the external case is connected to an additional power source through the second USB cable so that when the control panel is activated, the heating, vibrating and speaker elements are activated to control the environment of the universal child pad.

9. The universal control pad of claim 1 wherein the control panel may be manually activated and controlled.

10. The universal control pad of claim 1 wherein the control panel may be remotely activated and controlled.

11. The universal control pad of claim 1 wherein the control panel may be manually activated and controlled by an application downloaded on a mobile device.

* * * * *